United States Patent

Gold

[11] Patent Number: 5,864,429
[45] Date of Patent: Jan. 26, 1999

[54] VAN REAR WINDOW LIGHT REFLECTING TAPE

[76] Inventor: Peter Gold, 465 N. Wood Rd., Rockville Centre, N.Y. 11570

[21] Appl. No.: 871,749

[22] Filed: Jun. 9, 1997

[51] Int. Cl.[6] .............................. G02B 5/12; G02B 5/136; B60Q 11/00
[52] U.S. Cl. ......................... 359/549; 359/548; 116/28 R
[58] Field of Search ...................................... 359/520, 533, 359/548, 549, 528, 896; 116/28 R, 63 R, 63 P, 30, 35 P

[56] References Cited

U.S. PATENT DOCUMENTS 3,590,768  7/1971  Shanok ................... 116/28 R
5,751,212  5/1998  Findley ................... 116/63 P

*Primary Examiner*—Jon Henry
*Assistant Examiner*—Jennifer Winstedt
*Attorney, Agent, or Firm*—Myron Amer PC

[57] ABSTRACT

Van rear door window reflective tape to provide a light display when coacting with a headlight beam of an approaching motorist that is on an inside, rather than outside, window surface so that the door of a parked van when open provides the referred-to light display and, when the door is closed and the van backed into a garage, the reflective tape coacts with a van interior rear light to provide a light display that conveys a sense of the length of the van and facilitates the parking maneuver.

1 Claim, 1 Drawing Sheet

VAN REAR WINDOW LIGHT REFLECTING TAPE

The present invention relates generally to the use of light reflecting tape on a van to enhance not only the safer use thereof, but also having utility in the handling of the van. More particularly, the strategic location of the referenced tape obviates the incidence of accidents during loading and unloading the van, and has also been found to assist the driver when backing the van into a parking garage or the like.

EXAMPLES OF THE PRIOR ART

Prior patents suggesting the use of light reflecting tape to coact with headlight beams of approaching traffic to mark the presence of a vehicle are plentiful, one such prior patent being U.S. Pat. No. 3,590,768 for "Combination Decorative And Reflective Strip" issued to Victor Shanok et al. on Jul. 6, 1971. The reflective strip used in this patent is about the exterior peripheral edge of the vehicle's stationary rear window and there is, of course, no loading and unloading utility associated with the vehicle nor with respect to the referred to stationary window.

In U.S. Pat. No. 4,044,482 for "Warning Device" issued to Alfred Mosch on Aug. 30, 1977, use is made of the equivalent of light reflecting tape, namely an illuminated sign on the inside of an auto trunk lid which, when opened, marks the presence of the auto to approaching traffic during a breakdown, or arguably also during loading and unloading of the trunk of the auto.

In combination, the teachings of the '768 and '482 patents suggest the use of light reflecting tape on a window component of an auto, in accordance with the '768 patent, that might also have a degree of movement in the loading and unloading of the vehicle, in accordance with the '482 patent. For a van of a popular type having left and right rear doors with a stationary window on each, the prior art teachings suggest light reflecting tape on the exterior surface of the windows in facing relation to approaching traffic to coact with the headlight beams of such traffic.

Broadly, it is an object of the present invention to depart from the aforesaid prior art which, although effective in contributing to safer vehicle use, is unnecessarily limited to achieving this objective.

More particularly, it is an object of the present invention to achieve, by strategic location of light reflecting tape on a rear door-embodied van, not only a safer environment during loading and unloading of the van, but also to assist the driver in the handling of the van during a parking maneuver or the like, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figures 1, 2:
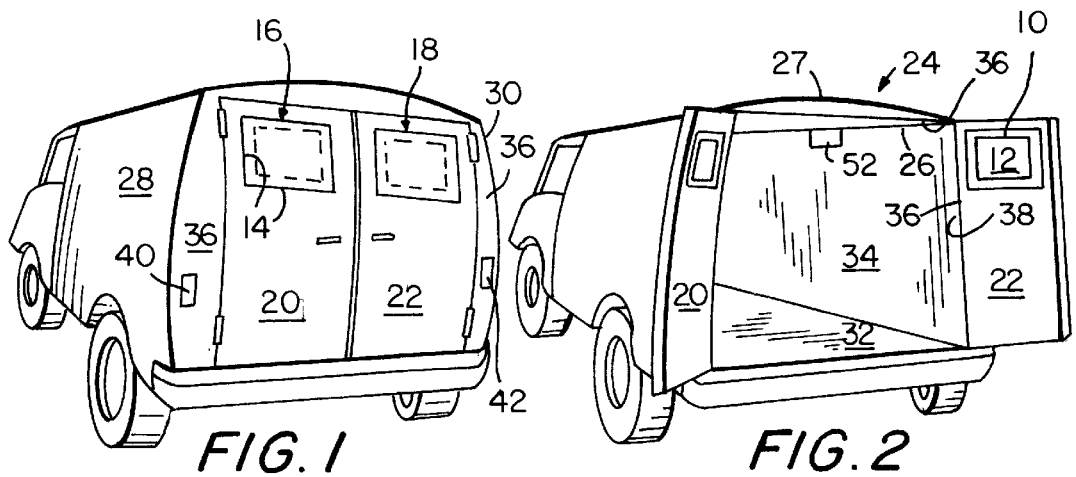
FIG. 1 is a rear perspective view of a van.
FIG. 2 is a view similar to FIG. 1, but with the van rear doors open.

The present invention resides in the use of reflective tape 10 adhered on the inside surface 12 and about the peripheral edges, individually and collectively designated 14, of the left and right stationary windows 16 and 18 of respective left and right van doors 20 and 22. The van, generally designated 24, otherwise is conventional, having a roof 27, opposite sides 28 and 30, and a floor 32, all cooperating to bound an interior space 34 for passenger use and cargo storage. Edges of said roof, opposite sides, and floor, individually and collectively designated 36, bound a rear opening 38 into the interior space 34.

Figure 3:
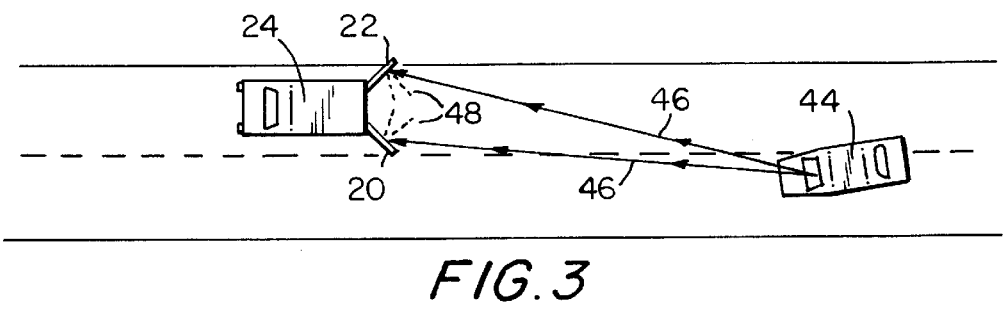
FIG. 3 is a schematic view of the parked van of FIG. 2 in relation to approaching traffic.

When the doors 20 and 22 are closed, tail lights 40 and 42 on the opposite side edges 36 are, as is readily evident, in clear view to approaching traffic, as exemplified by vehicle 44 in FIG. 3. However, with the doors 20 and 22 of a parked van 24 open as depicted in FIG. 2 to permit, for example, loading or unloading through the rear opening 38, the tail lights 40 and 42 are masked from view and the parked van 24 then constitutes a road hazard and creates a dangerous traffic condition. In accordance with the present invention, the light-reflective tape 10 on the interior of the windows 16 and 18 are, in the door open positions, in facing relation to oncoming and/or approaching vehicle(s) 44, and thus the headbeams 46 of approaching traffic impinge on the reflective strips 10 and in a known manner produce a light signal 48 which obviates the safety hazard nature of the parked van 24.

Figure 4:
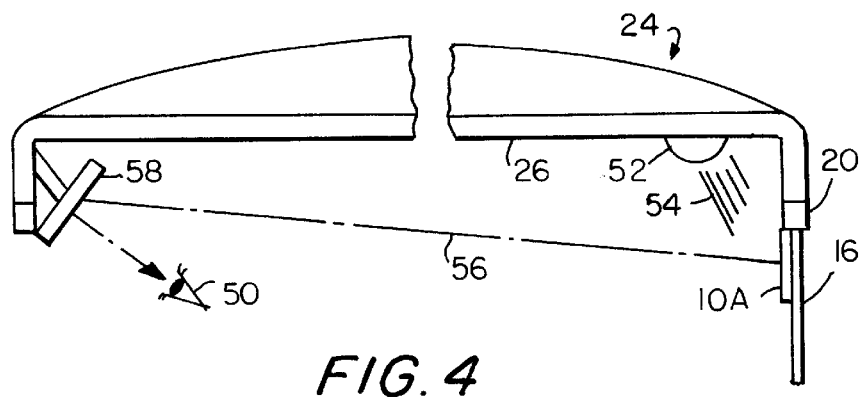
FIG. 4 is a partial longitudinal sectional view of the van illustrating a parking guide provided to the driver in accordance with the present invention.

With the doors 20 and 22 in a closed position, as depicted in FIG. 4, in which position the light-reflective strips 10 are then in facing relation to the driver 50, significant utility is derived from the strips. To assist in loading, unloading, entering and departing from the van using the rear opening 38, there is typically provided a rear light 52 in the interior of the roof 26 and in close adjacent position inwardly of the roof edge 36. Rear light 52 is used to advantage in that the light rays 54 emanating therefrom impinges on the reflective strips 10, particularly along the upper window edge-bordering strip length portion 10A, and the illumination thereof is in the line of sight 56 to the driver 50 via the van rear view mirror 58. In practice this has been found to provide the driver 50 with a sense of the lengthwise rearward dimension of the van, and consequently the illuminated light reflecting tape 10 serves as a light signal or parking guide during van movement backing into a garage or the like.

It is well understood that the light reflective surface of the tape 10 is made of one of many available reflective, phosphorescent or fluorescent materials. One such material is a reflective paint supplied by DUPLI-COLOR Products Co., Elk Grove Village, Ill. 60007 currently used for marking roadside obstacles, hazards, curbs and parking areas.

While the strategically located light reflective means herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For a van of a type having a roof, opposite sides and a floor bounding an interior space for passenger use and cargo storage, said roof, opposite sides and floor having rear edges bounding a rear opening into said interior space, and rearwardly facing tail lights on said opposite sides rear opening-bounding edges and an interior roof light spaced inwardly on an interior side of said roof adjacent said roof rear opening-bounding edge, an improved closure for said van rear opening comprising cooperating rear left and right doors each having an upper stationary window, hinge means on said opposite sides for pivotally mounting said rear left and right doors for pivotal movement between open and closed positions in relation to said interior space rear opening, and light reflecting tape positioned on an interior surface of said stationary windows and along selected peripheral edges thereof, whereby in an open condition of a rear door masking a tail light from view there is light impinging on said light reflecting tape from head lights of an approaching motorist to provide a light signal to said approaching motorist, and in a closed condition of a rear door there is light from said interior roof light impinging on said light reflecting tape to provide a light signal to a user of said van effective to serve as a parking guide during van movement backing into a garage.

* * * * *